US012158213B2

United States Patent
Gneuss et al.

(10) Patent No.: US 12,158,213 B2
(45) Date of Patent: Dec. 3, 2024

(54) MULTIPORT VALVE UNIT FOR PLASTIC MELTS AND OTHER MEDIUM- TO HIGH-VISCOSITY LIQUIDS

(71) Applicant: Gneuss GmbH, Bad Oeynhausen (DE)

(72) Inventors: Daniel Gneuss, Charlotte, NC (US); Stephan Gneuss, Bad Oeynhausen (DE); Detlef Gneuss, Carabietta (CH)

(73) Assignee: Gneuss GmbH, Bad Oeynhausen (DE)

( * ) Notice: Subject to any disclaimer, the term of this patent is extended or adjusted under 35 U.S.C. 154(b) by 46 days.

(21) Appl. No.: 18/136,939

(22) Filed: May 19, 2023

(65) Prior Publication Data

US 2023/0313892 A1 Oct. 5, 2023

Related U.S. Application Data (63) Continuation of application No. PCT/DE2022/100439, filed on Jun. 13, 2022.

(30) Foreign Application Priority Data

Jun. 18, 2021 (DE) ...................... 10 2021 115 905.9

(51) Int. Cl.
  *F16K 3/06* (2006.01)
  *F16K 3/314* (2006.01)
  *F16K 11/074* (2006.01)

(52) U.S. Cl.
  CPC .............. *F16K 11/074* (2013.01); *F16K 3/06* (2013.01); *F16K 3/314* (2013.01)

(58) Field of Classification Search
  CPC ........... F16K 11/074; F16K 3/06; F16K 3/314
  See application file for complete search history.

(56) References Cited

U.S. PATENT DOCUMENTS

| 4,588,502 A | * | 5/1986 | Zibell | ................. B29C 48/6914 210/171 |
| 6,550,497 B2 | | 4/2003 | Thiele et al. | |
| 9,127,777 B2 | | 9/2015 | Schaemann | |
| 11,504,895 B2 | | 11/2022 | Gneuss et al. | |

FOREIGN PATENT DOCUMENTS

| DE | 102009014029 A1 | 10/2010 |
| DE | 102016113979 B3 | 11/2017 |
| EP | 1167844 A2 | 1/2002 |
| WO | WO03090997 A1 | 11/2003 |
| WO | WO03090998 A1 | 11/2003 |
| WO | WO03090999 A1 | 11/2003 |

OTHER PUBLICATIONS

International Search Report dated Sep. 26, 2022 in corresponding application PCT/DE2022/100439.

* cited by examiner

*Primary Examiner* — P. Macade Nichols
(74) *Attorney, Agent, or Firm* — Muncy, Geissler, Olds & Lowe, P.C.

(57) ABSTRACT

A multiport valve unit for medium- to high-viscosity fluids having a housing comprising at least: an inlet plate having at least one main flow channel, an outlet plate having at least one main flow channel, and at least one secondary flow channel. At least one intermediate plate and/or at least one spacer element are located between the inlet plate and the outlet plate. The multiport valve unit also has at least one switching element mounted pivotably or rotatably in the housing, which switching element is located between the inlet plate and the outlet plate, and, in a starting position, connects the main flow channels to one another via at least one passage opening.

14 Claims, 10 Drawing Sheets

MULTIPORT VALVE UNIT FOR PLASTIC MELTS AND OTHER MEDIUM- TO HIGH-VISCOSITY LIQUIDS

This nonprovisional application is a continuation of International Application No. PCT/DE2022/100439, which was filed on Jun. 13, 2022, and which claims priority to German Patent Application No. 10 2021 115 905.9, which was filed in Germany on Jun. 18, 2021, and which are both herein incorporated by reference.

BACKGROUND OF THE INVENTION

Field of the Invention

The present invention relates to a multiway valve unit for plastic melts and other medium- to high-viscosity liquids.

Description of the Background Art

A multiway valve unit is known from DE 100 30 584 A1, which corresponds to US 2002/0124895, which is incorporated herein by reference. The at least one switching element rotatably mounted between two housing plates switches reliably, even at the high pressures and high temperatures typical with plastic melts. One embodiment with a switching element is configured as a 3/2 valve and makes it possible to selectably direct the main flow path from an inlet port to one of two outputs. With two switching elements in the form of circular disks, a 4/7 valve is created that permits extensive changeover possibilities between the total of four connections. By this means, two separate circuits can be operated next to one another, and alternating transfers can be created between them. Since the switching element is designed as a circular disk, a commensurately large housing is provided, with the result that a large installation space is required for installing the multiway valve unit. Furthermore, the fluid flow is interrupted at the moment of the changeover by rotation of the at least one switching element, which leads to problems owing to pressure peaks in upstream and downstream production equipment.

A simple filtration device is described in WO 2003 090 998 A1, in which, by pivoting a screen support with two screen elements, one screen element at a time can be pivoted into the production flow. The production flow is interrupted during the changeover between the two screen locations. The use as a changeover valve with no filtering function is not described or even possible, since two branching lines cannot be connected on the output side, nor is any changeover possibility provided on the movable screen support.

WO 2003 090 997 A1 shows another screen changing device, in which one of two screens arranged on a segment-shaped support can be brought into or taken out of the production flow by pivoting the support. There is no disclosure of changeover possibilities by means of secondary flow passages, etc.

DE 10 2009 014 029 B4, which corresponds to US 2012/0097278, and which describes a changeover valve with which the goal of not interrupting the production flow even during the changeover from one output line to the other output line is indeed achieved. However, the construction is completely different from a generic multiway valve unit, because it is based on a cylindrical bolt that is axially movable in a bore of a housing. To achieve a leak-tight connection, great manufacturing effort is required for the fit between bolt and bore. A postprocessing involving material removal is not possible, for example.

SUMMARY OF THE INVENTION

It is therefore an object of the present invention to provide a multiway valve unit that is suitable for plastic melts and fluids with similarly high viscosity, that permits a transfer of the fluid from a main flow passage to at least one secondary flow passage, that requires less space, and that is simpler to produce and to post process than, e.g., in the case of a changeover valve with a cylinder bolt.

This object is attained in an exemplary embodiment by a multiway valve unit for plastic melts.

Provision is firstly made according to the invention that the switching element can be designed in the shape of a segment, in particular in the shape of a circular segment. Mounting does not take place directly at the edge, but instead the pivot axis is offset toward the center of the segment. In this design, the narrow side of the segment serves as a control cam at which a connection is produced to a drive, such as, in particular, a linearly acting drive by a hydraulic cylinder.

The recesses through which flow can pass may be arranged in the other part of the segment area, and the pivot axis can be located in between. Because the recesses through which flow can pass are arranged on a circular segment, which in particular is from ⅙ to ⅛ the size of a full circle, significantly less installation space is required than is the case with the known multiway valve having at least one circular disk as switching element.

In addition, the invention provides a configuration in which the recesses through which flow can pass for main and secondary flow passages are arranged to be radially distant from one another or extend between two different pitch circles. As a result, the pressurized area is reduced to a narrow area adjacent to a single radius line and can be sealed well.

The structure of the housing is similar to that of rotary screen filtering devices, which is to say the movable switching element is mounted between an inlet plate and an outlet plate, wherein the inlet and outlet plates are held at a distance from one another by inserted intermediate plates and/or by other spacer elements in such a manner that a minimal gap exists in each case between the switching element and the inlet and outlet plates, which gap permits the switching element to move but prevents fluids with suitably high viscosity from exiting.

The pressurized area may be located inside a polygon that is defined by multiple clamping elements that screw the plates of the housing together and preload them against one another with the inclusion of the movable switching element.

Only three clamping bolts or clamping screws that define a preloading triangle in which the recesses through which flow can pass may be arranged.

Further preferably, one of the clamping bolts or clamping screws simultaneously forms the axis about which the switching element can pivot.

The return passage can be a recess that extends inward from a segment surface but does not lead to a complete piercing of the segment disk. The edges can be made perpendicular to the surface as in a groove or can also be rounded or beveled in the form of a trough. The return passage serves to guide the flow on one side of the switching element from one flow passage into the other, but not to pass it through.

In order to permit operation without interruption of the main flow passage during the changeover, provision is preferably made that the size, shape, and location of the radially inner through opening and of the return passage on the switching element are chosen with respect to the size and position of the terminating opening of the main flow passage in the inlet plate and/or outlet plate such that the terminating opening continuously overlaps with the through opening during pivoting of the switching element. As a result, the main flow passage is not closed off, and uninterrupted operation is possible.

In connection with the present invention, "not closed off" or "uninterrupted" means, in particular, that the flow passage cross section is not so strongly restricted in any operating state of the multiway valve unit that more than 80% of the cross-sectional area of the respective flow passage in the multiway valve unit is covered by the switching element and/or that a sharp pressure increase occurs owing to the change in cross section in the flow passage during the changeover process.

For uninterrupted operation, a bridging web that is narrower than the diameter of the terminating opening of the main flow passage is formed on the switching element, in particular between the radially inner through opening and the return passage.

Uninterrupted operation in two mutually independent circuits as well as a changeover between them with no interruption are possible. For this purpose, the size, shape, and location of the radially outer through opening and of the return passage on the switching element are chosen with respect to the size and position of the terminating opening of the secondary flow passage in the inlet plate and/or outlet plate such that the terminating opening continuously overlaps either with the through opening or with the return passage or with both during pivoting of the switching element.

Furthermore, it is possible to choose the diameter of the outer through opening to be significantly larger than the diameter of the inner through opening and also to shape accordingly the grooves provided between them on one side. This applies in particular to the tangential extension of the through openings or their extension along the respective pitch-circle arc.

Since the opening cross-sections lie on the same pitch circle in each case, a small pivot angle of the switching element suffices to accomplish the changeover, wherein the opening cross-sections on the inner pitch circle as well as those on the outer pitch circle overlap at the same time.

It is possible to provide circular cross sections for the openings on the inner pitch circle and on the outer pitch circle. For this purpose, it is necessary to design the segment-shaped switching element to be longer, so that the overall size increases.

It is therefore especially preferred for the outer through opening and/or an outer section of the return passage to be designed with an oblong or arched shape and to extend along the outer pitch circle. In this case, however, the respective radial extension of the openings on the two pitch circles is approximately equal. The continuous overlap of the cross sections during the changeover can likewise be achieved in this way, wherein a very compact size is achieved.

The main and secondary flow passages in the housing plates each have circular cross sections, since they are easy to manufacture. Elliptical or oblong cross sections in the housing are also possible, however.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
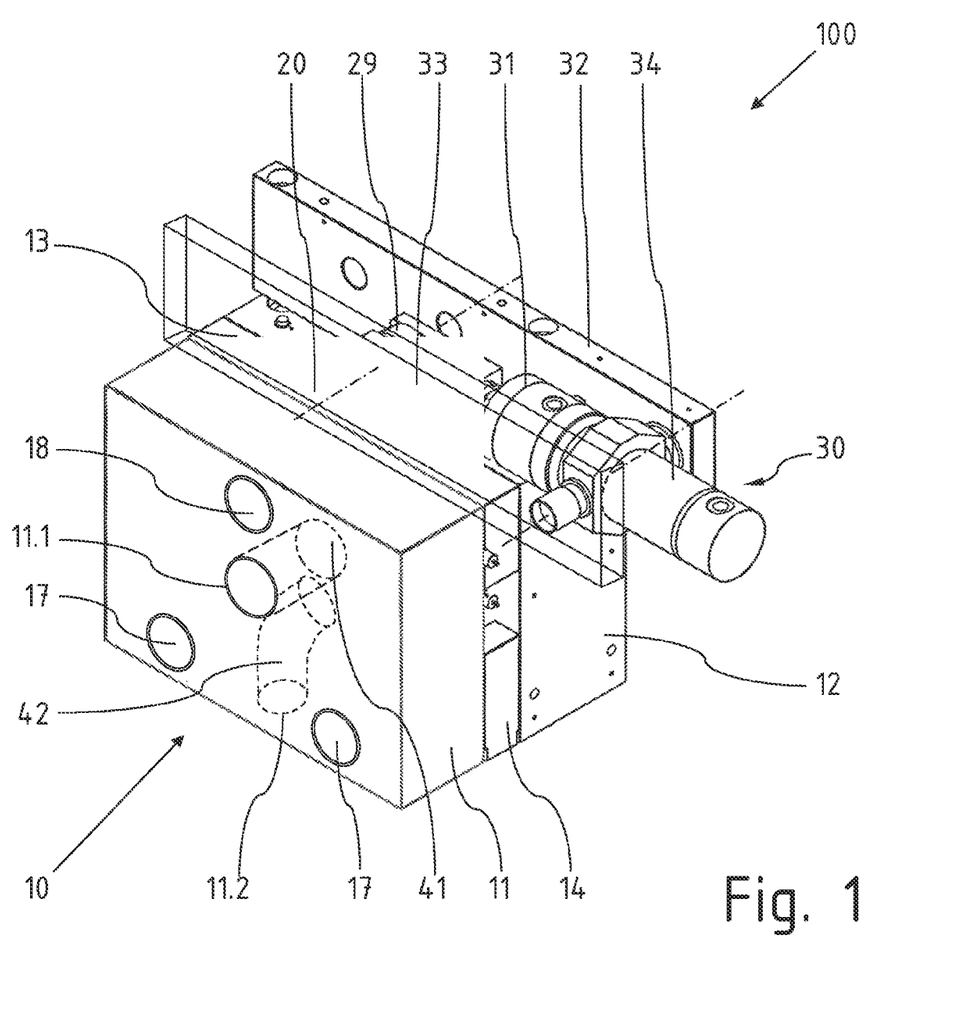
FIG. 1 shows a multiway valve unit in a perspective view at an angle from the front.

FIG. 1 shows a multiway valve unit 100 in a perspective view at an angle from the front. This valve comprises a housing 10, a switching element 20 that is pivotably mounted therein, and a drive unit 30 for the switching element 20.

The housing 10 can be formed of an inlet plate 11 with a main flow passage 41 that terminates at an inlet-side terminating opening 11.1, and with a secondary flow passage 42 that terminates at a terminating opening 11.2, multiple intermediate plates 13, 14 and a spacer element 15, and an outlet plate 12, which in turn contains outlet openings and terminating openings for the main and secondary flow passages.

The plates 11, 12, 13, 14 and the spacer element 15 are connected to one another and preloaded against one another by three clamping bolts 17, 18 that extend straight through the entire stack of plates.

The drive unit 30 is arranged on the top of the housing 10 and includes two parallel crossbeams 32, of which a front crossbeam is represented as transparent in FIG. 1 for the sake of clarity. A hydraulic cylinder 31 constitutes the drive. The hydraulic cylinder 31 is pivotably mounted between the crossbeams 32 on an axis 34. A piston rod of the hydraulic cylinder 31 is connected to a cam 29 of the switching element 20 by a fork element 33.

Figure 2:
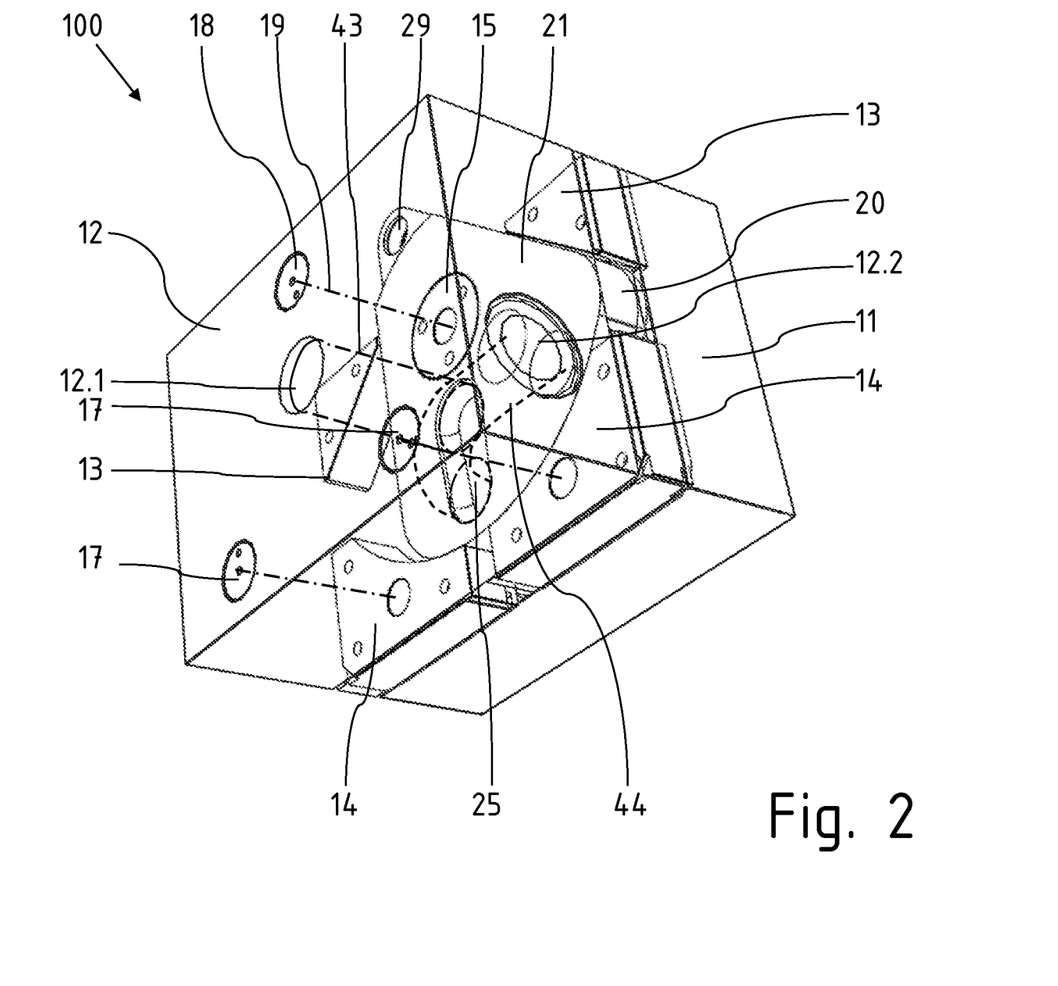
FIG. 2 shows the multiway valve unit in a perspective view at an angle from the rear.

FIG. 2 shows the multiway valve unit 100 in a perspective view from the rear and from below at an angle, which is to say from the outlet side. Here, the outlet plate 12 is represented as transparent in order to allow the elements arranged between the inlet plate 11 and the outlet plate 12, namely the fixed intermediate plates 13, 14 and the pivotably arranged switching element 20, to be visible. The switching element 20 is mounted with a bore on a spacer element 15; a plain bearing is implemented between them. Also visible are the arrangement and path of the three clamping bolts 17, 18, which extend straight through the entire plate stack of the plates 11, 12, 13, 14 including the spacer element 15. In this design, the center of the top clamping bolt 18 simultaneously constitutes a pivot axis 19 about which the switching element 20 can move.

The switching element 20 is in the shape of a circular segment. On a vast majority of its surface facing the inlet or outlet plate 11, 12, it is implemented as seal face 21. Recesses for conducting the fluid, and the spacer element 15 serving as a bearing, are arranged within the seal face 21. The cam 29 projects out of the housing 10 at the top and is connected to the drive.

The main flow passage 43 extends straight through the outlet plate 12 all the way to an outlet-side terminating opening 12.1. A curved secondary flow passage 44 that terminates at an outlet-side terminating opening 12.2, which is arranged in a lateral surface of the outlet plate 12, also runs within the outlet plate 12.

The intermediate plates 13, 14 and the spacer element 15 have the task of positioning the inlet plate 11 and the outlet plate 12 at a constant, precisely defined distance from one another. In addition, the intermediate plates 13, 14 can serve as a fixed stop to limit the movement of the switching element 20.

In this design, the thickness of the intermediate plates 13, 14 or of the spacer element 15 and the thickness of the switching element 20 must be matched to one another such that there is a slight oversize of the intermediate plates 13, 14 and spacer element 15, so that a minimal gap forms between the switching element 20 in the area of its seal face 21 and the adjacent surfaces of the inlet and outlet plates 11, 12. The gap permits the movement of the switching element 20 relative to the inlet and outlet plates 11, 12, but on the other hand is so small that a medium- to high-viscosity medium such as a plastic melt can only enter the gap to a very small degree without flowing out of the housing 10 in the process. The fluid entering the gap acts virtually as a lubricant for the movable switching element 20 in this case. The necessary sealing effect in a multiway valve unit 100 according to the invention is thus only achieved in conjunction with the use of appropriate medium- to high-viscosity media, in particular plastic melts. The multiway valve unit 100 according to the invention is therefore not suitable for the distribution of gases and low-viscosity fluids such as water.

The main flow passage formed within the multiway valve unit 100 extends in a straight line from the inlet-side terminating opening 11.1 (see FIG. 1) through a corresponding through opening in the switching element 20 and through a main flow passage 43 to the outlet-side terminating opening 12.1. A secondary flow passage 44 in the outlet plate 12 extends from the contact plane with the switching element 20 in the interior to a lateral terminating opening 12.2.

Introduced in the seal face 21 of the switching element 20 facing the outlet plate 12 is a recess as return passage 25 through which a flow connection can be produced between the main flow passage 43 and the secondary flow passage 44.

The arrangement of the terminating openings 11.2, 12.2 of the secondary flow passages 42, 44 on one of the lateral surfaces of the respective inlet or outlet plate 11, 12 has the advantage that the multiway valve unit 100 can be inserted directly into a production line via the main flow passage 41, 43 that opens onto the two end faces and can be connected to upstream or downstream production equipment, wherein the connections to the secondary flow passages 42, 44 do not present an impediment.

The exemplary embodiment of the multiway valve unit 100 therefore includes four connections to the terminating openings 11.1, 11.2, 12.1, 12.2 and provides two different operating positions of the switching element, so it is a 4/2 valve.

Figure 3A:
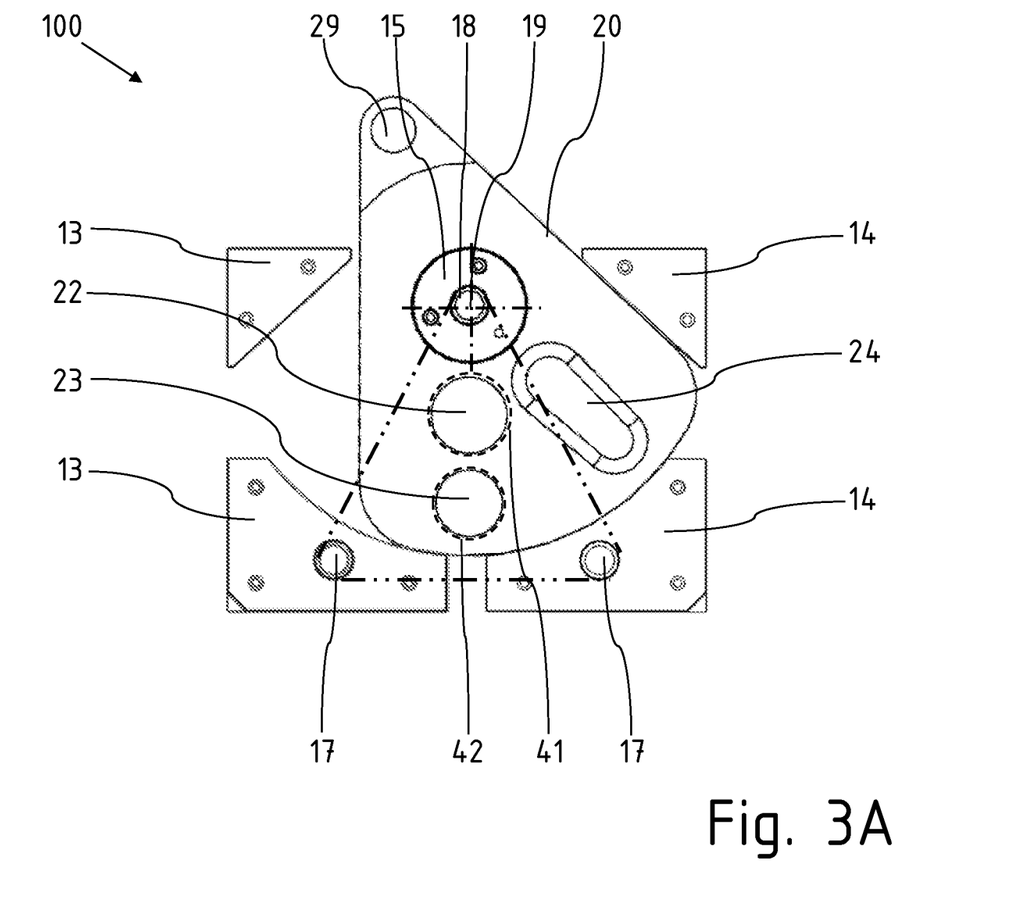
FIGS. 3A to 3C show various positions of the multiway valve 100 according to an example.
Figure 3B:
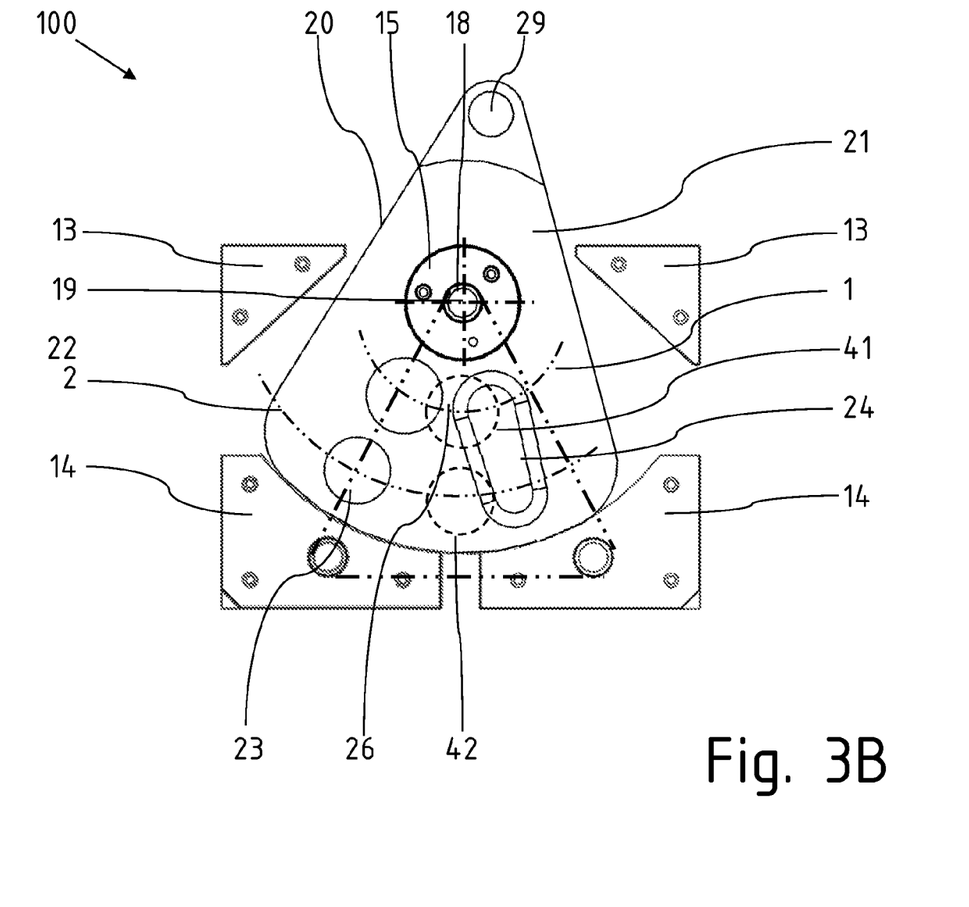
Figure 3C:
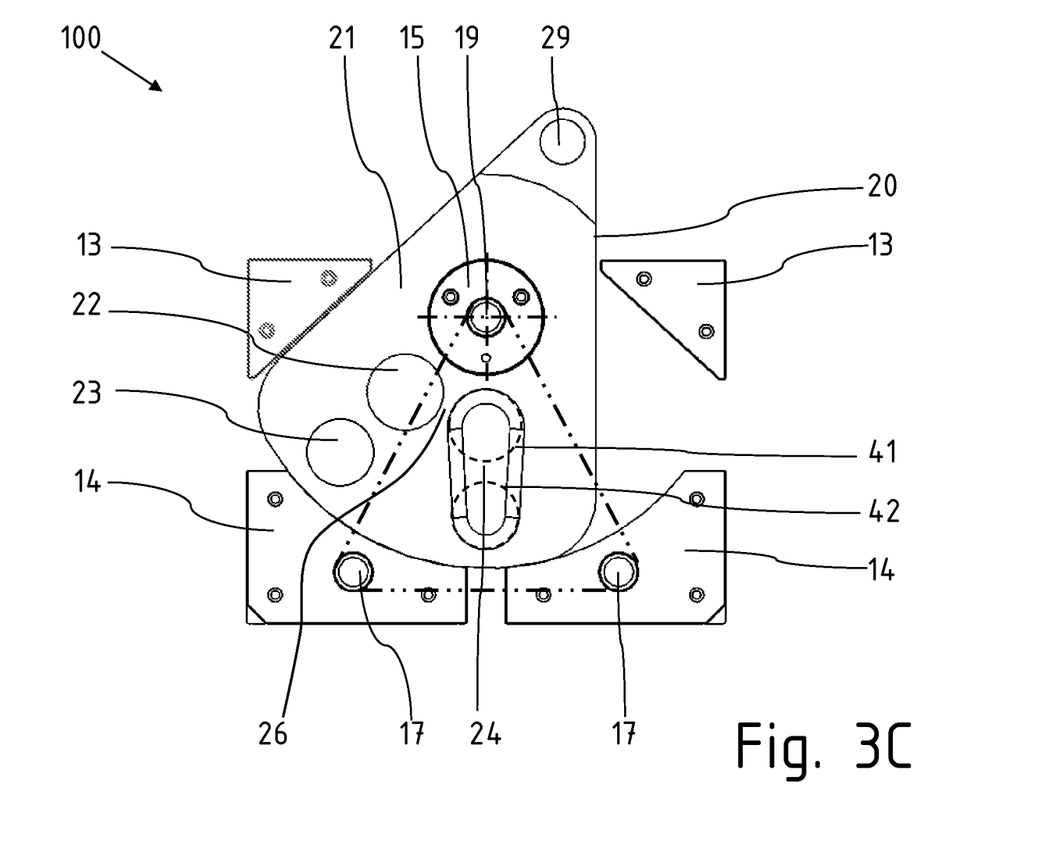

Shown in FIGS. 3A to 3C are various positions of the multiway valve 100 during changeover, for which purpose only the elements arranged between the inlet and outlet plates 11, 12 are shown in each case, specifically with a view of the front of the switching element 20 facing the inlet plate.

The switching element 20 is pivotably mounted on a pivot axis 19 formed by the spacer element 15. The latter is annular. The outer circumference serves as a plain bearing surface and the inner circumference serves to accommodate the clamping bolt 18. The dashed circles indicate the locations of the main flow passage 41 and secondary flow passage 42. The switching element 20 has two through openings 22, 23, which are designed as round bores and extend completely through the switching element 20. Another recess is designed in the form of a groove 24, which is located on the front of the switching element 20 facing the inlet plate.

The position of the switching element 20 shown in FIG. 3A corresponds to an initial position of the multiway valve unit 100, in which the respective main flow passages 41, 43 in the inlet and outlet plates 11, 12 are connected via the through opening 22 in the switching element 20, and at the same time the respective secondary flow passages 42, 44 are connected via the through opening 23. It also is visible here that a triangle, within which are located the flow paths formed by main and secondary flow passages 41, 42, is defined by the clamping bolts 17, 18. This serves to increase seal tightness, since the gap width between the inlet and outlet plates 11, 12 of the housing 10 and the switching element 20 can be regulated in that the pressurization by the flowing fluid can be countered with a corresponding preloading at the clamping bolts 17, 18, and excessive widening can be prevented as a result.

FIG. 3B shows an intermediate position during changeover. The switching element has been pivoted clockwise by about 30° compared with FIG. 3A.

In order to permit uninterrupted operation in the main flow passage 41 even during changeover, this passage is arranged radially closer to the pivot bearing of the switching element 20 or the pivot axis 19 than the secondary flow passage 42 is. In addition, a bridging web 26 is formed that is located between the bore 22 for the main flow passage 41 and the return passage 24. At a reference line 1 about the pivot axis 19, which passes through the center point of the bore 22 and of a radially inner area of the return passage 24, the bridging web 26 is narrower than the diameter of the bore 22 and than the preferably equally large cross-sectional opening of the main flow passage 41.

In the intermediate position from FIG. 3B, the main flow passage 41 overlaps both with the bore 22 of the switching element 20 and with the radially inner area of the return passage 24. In this way, some of the fluid can still continue to flow through the main flow passage 41, 43, while a connection to the secondary flow passage 42 already exists through the return passage 24.

In FIG. 3C, the changeover position is shown, in which the switching element 20 separates the main flow passages 41, 43 as well as the secondary flow passages 42, 44 on the inlet and outlet plates 11, 12 from one another. Instead, a connection of the main flow passage 41 to the secondary flow passage 42 on the inlet plate 11 is produced via the return passage 24. The same occurs on the far side of the switching element 20 at the outlet plate.

Figure 4:
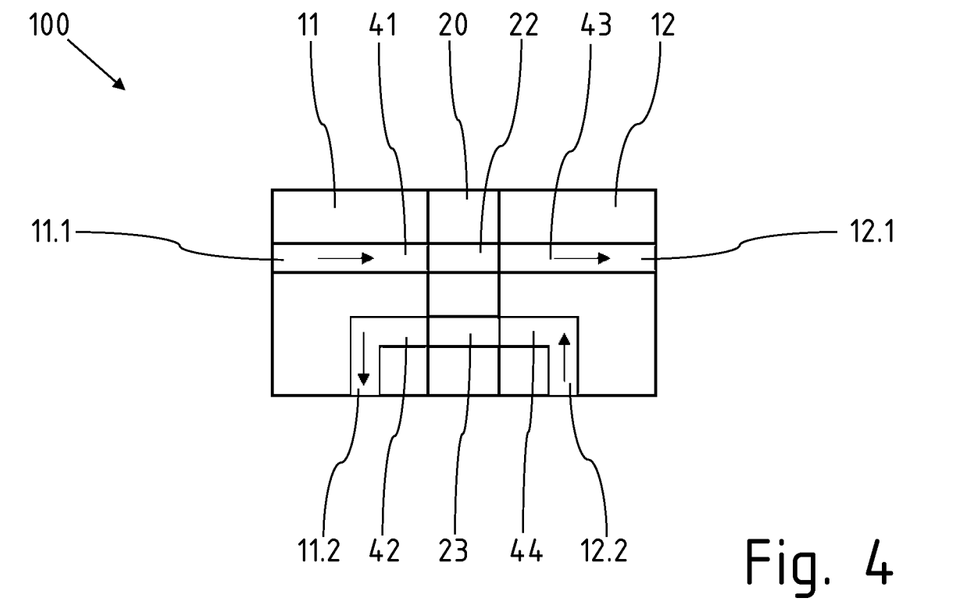
FIG. 4 is/shows the multiway valve unit in an initial position in a schematic cross-sectional view.
Figure 5:
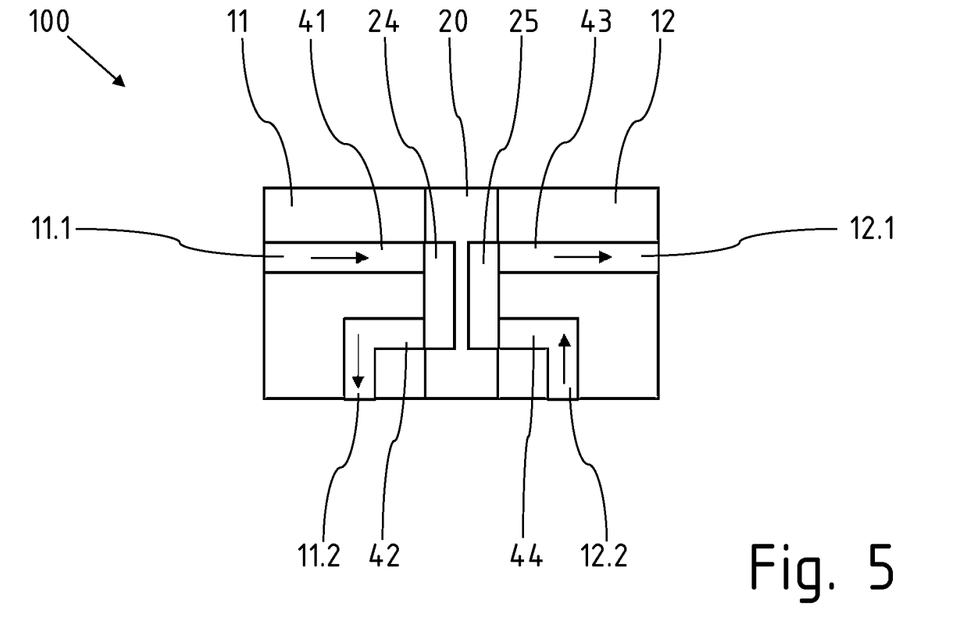
FIG. 5 is/shows the multiway valve unit in a changeover position in a schematic cross-sectional view.

The two possible operating positions of the multiway valve unit 100 are shown in FIGS. 4 and 5, in a schematic, cross-sectional side view in each case. The arrows therein each indicate possible flow directions.

In FIG. 4, a flow path configuration corresponding to the position of the switching element 20 in FIG. 3A is shown that corresponds to the initial position in normal operation of the multiway valve unit 100. The fluid enters the main flow passage 41 on the inlet plate 11 through the inlet-side terminating opening 11.1, runs into the main flow passage 43 on the outlet plate 12 through the through opening 22 in the switching element 20, and exits again at the outlet-side terminating opening 12.1. At the same time, a flow connection in the opposite direction exists from the terminating opening 12.2 on the outlet plate 12.2 into the secondary flow passage 44, through the through opening 23 into the secondary flow passage 42 in the inlet plate 11, and out of the terminating opening 11.2.

In FIG. 5, the multiway valve unit 100 is in the changeover position. A connection now exists between the flow passages 41, 42 in the inlet plate 11 as well as between the flow passages 43, 44 in the outlet plate 12, in each case through one return passage 24, 25 on the switching element 20. No reversal of the flow directions on account of the changeover takes place with the configuration in FIGS. 4 and 5.

Figure 6A:
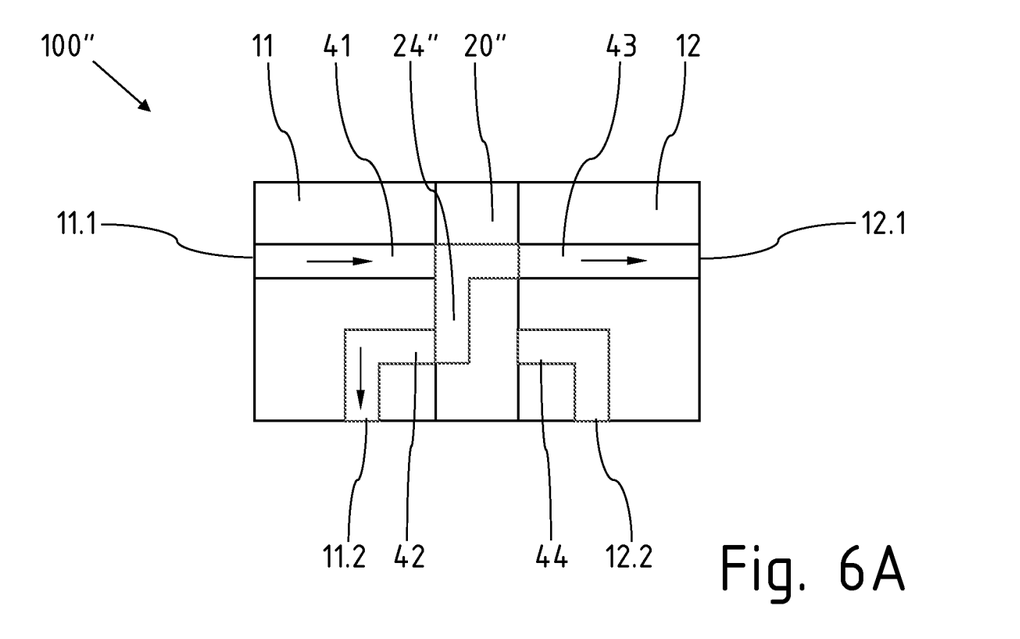
FIGS. 6a and 6b show a multiway valve unit according to an example in a schematic cross-sectional view.
Figure 6B:
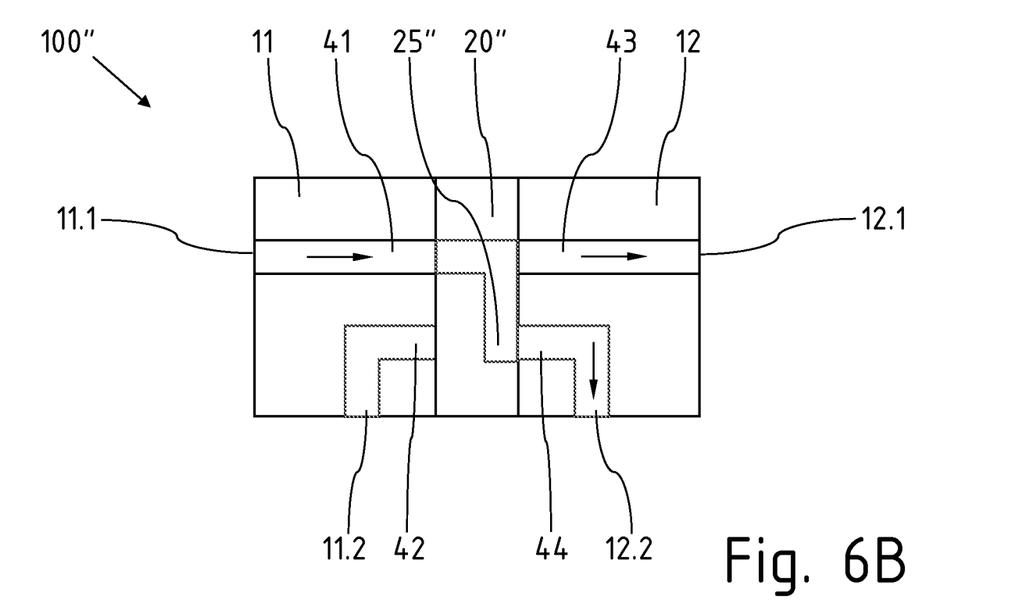

FIGS. 6A and 6B each schematically show a section through another embodiment of a multiway valve unit 100" in a changeover position. The initial position of the multiway valve unit 100" is analogous to the representation from FIG. 4, which is to say, in the initial position there is a connection between the flow passages 41, 42 in the inlet plate 11 as well as between the flow passages 43, 44 in the outlet plate 12, in each case through one of the through openings on the switching element 20". In other words, there are a continuous main flow passage and a continuous secondary flow passage.

With the changeover, the main flow passage remains open; however, an additional flow connection is produced between the main flow passage and a section of the secondary flow passage. For this purpose, the switching element 20" provides a return passage 24" on one side that comprises a groove that extends radially on one side of the switching element 20" and terminates in a through opening, resulting in the L-shaped configuration in cross-section. The secondary flow passage 44 is closed off, and the secondary flow passage 42 is fed from the main flow passage 41, 43 with the direction of flow being maintained.

In this embodiment, another return passage 25" can be provided at a third angular position on the segment-shaped switching element 20". The return passage 25" is also composed of a through opening and a single-sided groove on the other side of the switching element 20", so that the secondary flow passage 44 in the outlet plate 12 can be linked to the main flow passage 43. In this case, the flow direction reverses, so this position is suitable for backwashing of the secondary flow passage, for example.

Figure 7A:
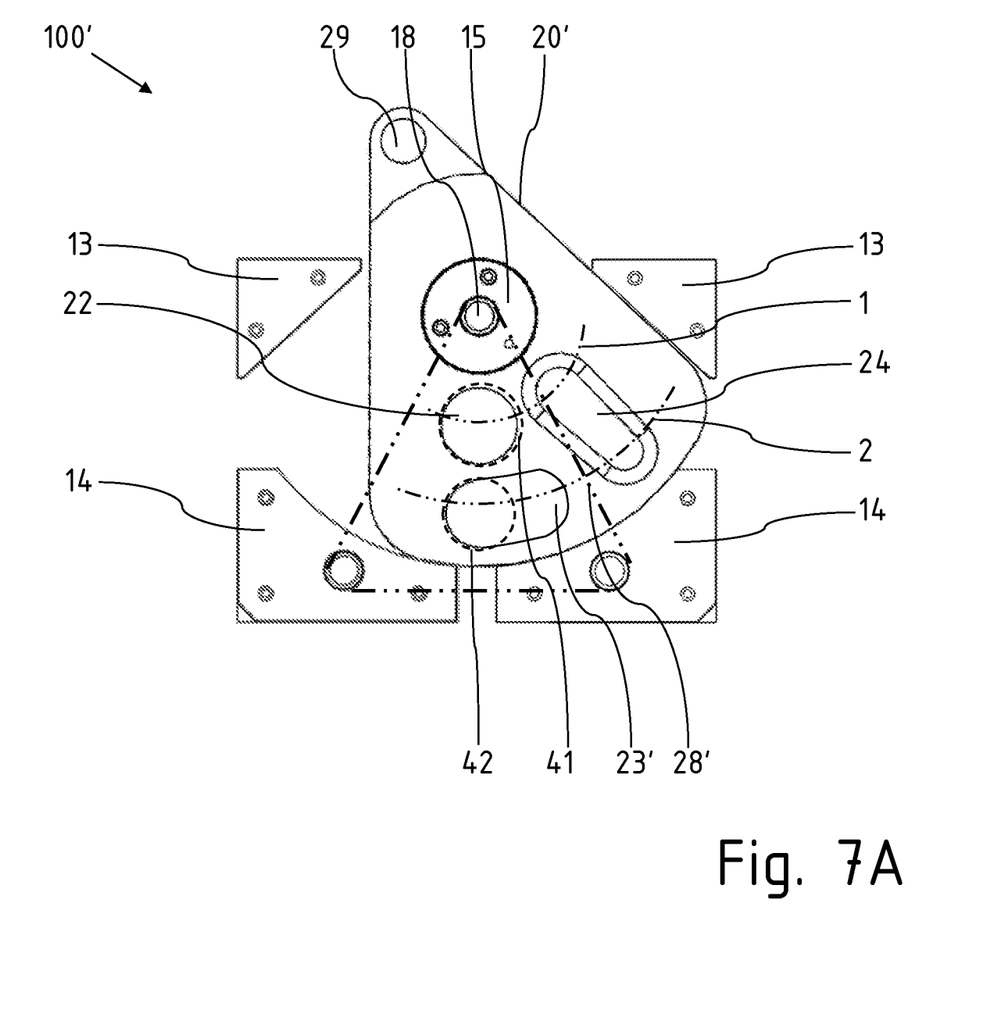
FIGS. 7A to 7C show various positions of the multiway valve according to an example.
Figure 7B:
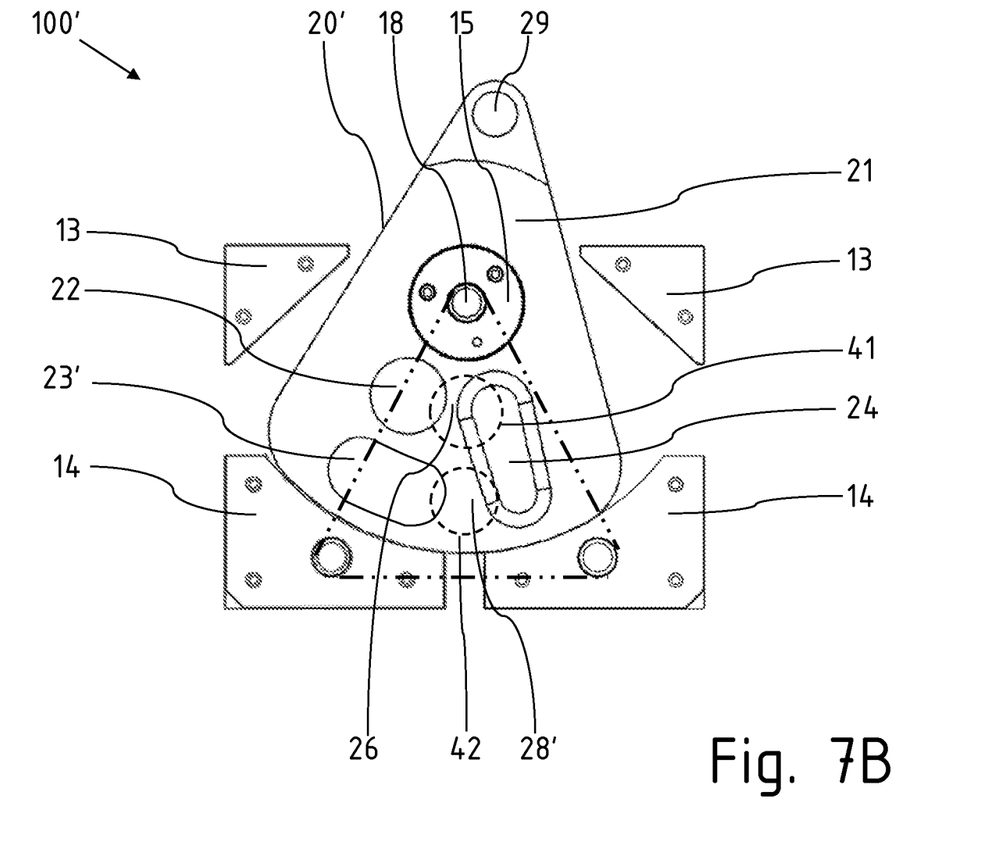
Figure 7C:
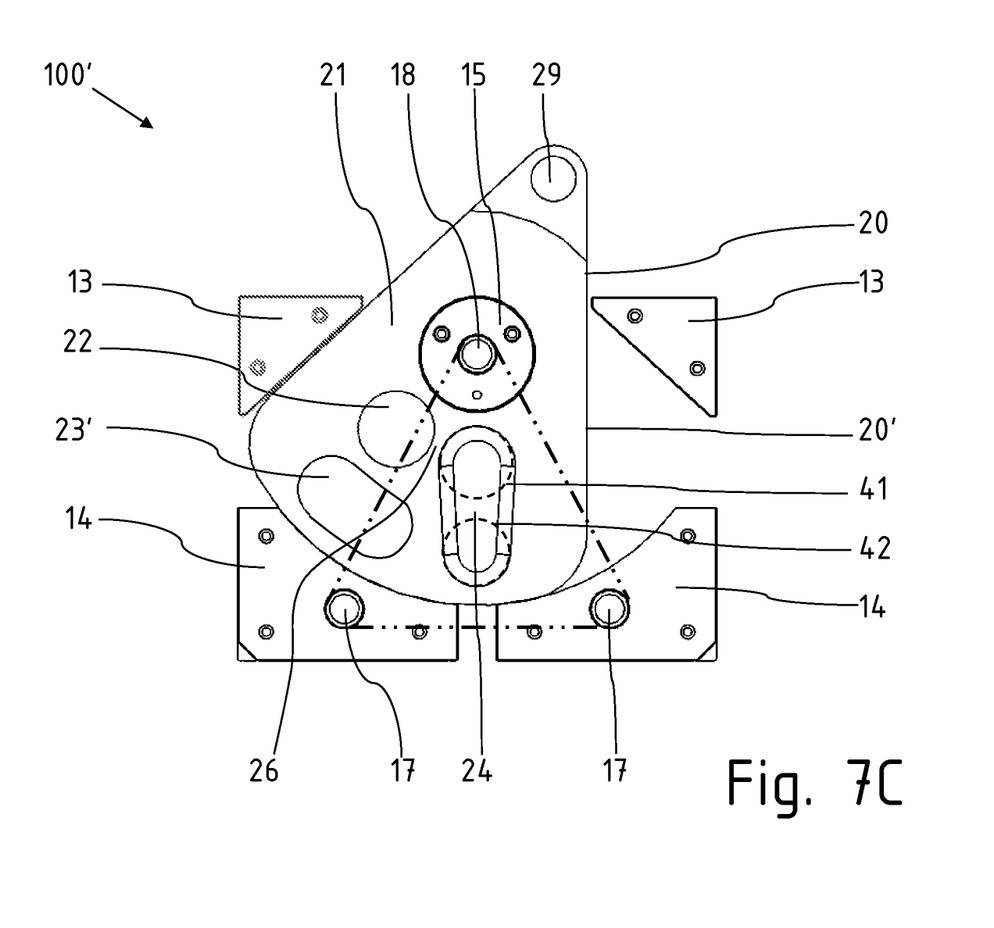

FIGS. 7A to 7C show, each in a position analogous to FIGS. 3A to 3C, a multiway valve unit 100' with a further embodiment of a switching element 20'. Its segment shape, mounting on the clamping bolts 18, as well as position and size of the through opening 22, are identical to the first embodiment. The difference is the shape of a recess 23' that is located radially outside the through opening 22 and that here is designed as an oblong hole or as an arched recess. This is likewise a through opening in the switching element 20'.

In an initial position from FIG. 7A, the two main flow passages 41, 43 of the inlet plate 11 and of the outlet plate 12 are connected to one another by the through opening 22. At the same time, the secondary flow passages 42, 44 in the inlet plate 11 and the outlet plate 12 are connected to one another by the recess 23'. The portion of the cross-sectional area of the recess 23' that is not directly in alignment with the secondary flow passages 42, 44 is likewise pressurized. It is still located within the area preloaded by the clamping bolts 17, 18.

In FIG. 7B, an intermediate position between the two operating states of the multiway valve unit 100 according to the invention is shown in a manner analogous to FIG. 3B. It can be seen here that the through opening 22 and the return passage 24 are connected to one another by the terminating opening 11.3 on the side closer to the axis 21 in the radial direction. At the same time, a flow connection also exists between the outer area of the return passage 24, the secondary flow passage 42, and the oblong recess 23' in this intermediate position. Owing to the modified switching element 20', a continuous operation can be achieved in all flow passages in this embodiment of the multiway valve unit 100', which is to say neither the main flow passage 41, 43 nor the secondary flow passage 42, 44 is completely closed off during the changeover process.

In FIG. 7C, the changeover position is once again reached in which the flow passages 41, 42 within the inlet plate 11 and the flow passages 43, 44 within the outlet plate 12 are connected to one another in pairs by the return passages 24, 25.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A multiway valve unit for plastic melts and other medium- to high-viscosity fluids, the multiway valve unit comprising:
    a housing that comprises at least an inlet plate with at least one main flow passage, an outlet plate with at least one main flow passage, and at least one secondary flow passage;
    at least one intermediate plate and/or at least one spacer element being arranged between the inlet plate and the outlet plate;
    at least one switching element pivotably or rotatably mounted in the housing, the switching element being arranged between the inlet plate and the outlet plate,
    wherein the at least one switching element, in an initial position, connects the main flow passages to one another through at least one through opening,
    wherein the at least one switching element, in at least one changeover position, connects at least one of the main flow passages to the at least one secondary flow passage through at least one return passage that opens at only one side of the switching element,
    wherein the switching element is designed in a shape of a segment and arranged adjacent to the intermediate plate and/or to the at least one spacer element,
    wherein terminating openings of the main flow passages present in the inlet plate and/or in the outlet plate and facing toward the switching element and a terminating opening of the at least one secondary flow passage are arranged on different pitch circles with respect to a pivot axis of the switching element, and wherein the return passage on the switching element extend between the pitch circles.

2. The multiway valve unit according to claim 1, wherein the inlet plate and the outlet plate each have a main flow passage and a secondary flow passage.

3. The multiway valve unit according to claim 2, wherein the switching element has one return passage on each of the two sides.

4. The multiway valve unit according to claim 2, wherein the switching element has one through opening on each of the two pitch circles.

5. The multiway valve unit according to claim 1, wherein the switching element for producing a flow connection between the open main flow passage and at least one section of the secondary flow passage has at least one return passage that extends between the pitch circles and that links to one of the through openings.

6. The multiway valve unit according to claim 1, wherein a size, shape, and location of the radially inner through opening and of the return passage on the switching element are chosen with respect to the size and position of the terminating opening of the main flow passage in the inlet plate and/or outlet plate such that the terminating opening continuously overlaps either with the through opening or with the return passage or with both during pivoting of the switching element.

7. The multiway valve unit according to claim 1, wherein the terminating openings of the main flow passages on the switching element and the associated through opening on the switching element are arranged closer to the pivot axis than the terminating opening of the at least one secondary flow passage.

8. The multiway valve unit according to claim 1, wherein at least one bridging web that is narrower than a diameter of the terminating opening of the main flow passage is formed on the switching element between at least one through opening and the return passage.

9. The multiway valve unit according to claim 4, wherein the through openings lie on a same radius line, and wherein the longitudinal extents of the return passages are oriented radially between the pitch circles.

10. The multiway valve unit according to claim 4, wherein a tangential extent of the through opening located on the outer pitch circle is larger than a tangential extent of the inner through opening.

11. The multiway valve unit according to claim 10, wherein the outer through opening is designed with an oblong or arched shape and extends along the outer pitch circle.

12. The multiway valve unit according to claim 1, wherein the respective terminations of the main flow passage and of the secondary flow passage in the inlet plate at a transition to the switching element and in the outlet plate at a transition from the switching element, are arranged inside a polygon that is defined by multiple clamping elements that extend through the adjacent plates and, if applicable, through the spacer element.

13. The multiway valve unit according to claim 12, wherein three clamping elements are provided that define a triangle.

14. The multiway valve unit according to claim 1, wherein the return passage is formed by at least one groove or trough introduced in one side of the switching element.

* * * * *